United States Patent
Wood et al.

(10) Patent No.: US 7,225,383 B1
(45) Date of Patent: May 29, 2007

(54) SYSTEM AND METHOD FOR ENHANCING COMMUNICATION BETWEEN DEVICES IN A COMPUTER SYSTEM

(75) Inventors: David Wood, Madison, WI (US); Robert C. Zak, Jr., Bolton, MA (US); Monica Wong-Chan, Concord, MA (US); Christopher J. Jackson, Westford, MA (US); Thomas P. Webber, Petersham, MA (US); Mark D. Hill, Madison, WI (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/487,529

(22) Filed: Jan. 19, 2000

(51) Int. Cl.
*G06F 11/00* (2006.01)

(52) U.S. Cl. .......................... 714/749; 370/252; 707/1

(58) Field of Classification Search .................. 714/48, 714/735–737, 748–749, 2, 750; 709/321–327; 370/216, 252, 394; 455/438; 707/1
See application file for complete search history.

(56) References Cited

U.S. PATENT DOCUMENTS

| | | | |
|---|---|---|---|
| 5,187,795 A * | 2/1993 | Balmforth et al. ............. 712/38 |
| 5,189,734 A * | 2/1993 | Bailey et al. ................ 455/438 |
| 5,210,867 A * | 5/1993 | Barlow et al. ................ 714/17 |
| 5,410,536 A * | 4/1995 | Shah et al. .................. 370/216 |
| 5,594,875 A | 1/1997 | Thaller |
| 5,689,713 A | 11/1997 | Normoyle et al. |
| 5,717,872 A | 2/1998 | Whittaker |
| 5,884,052 A * | 3/1999 | Chambers et al. ........... 710/107 |
| 5,892,957 A | 4/1999 | Normoyle et al. |
| 5,923,662 A | 7/1999 | Stirling et al. |
| 5,943,483 A | 8/1999 | Solomon |
| 5,944,808 A * | 8/1999 | Penry ......................... 710/314 |
| 6,018,810 A * | 1/2000 | Olarig .......................... 714/43 |
| 6,088,335 A * | 7/2000 | I et al. ........................ 370/252 |
| 6,181,704 B1 | 1/2001 | Drottar et al. |

(Continued)

OTHER PUBLICATIONS

International Search Report, application No. PCT/US 01/01901, mailed Nov. 5, 2001.

(Continued)

*Primary Examiner*—William Thomson
*Assistant Examiner*—Phuong N. Hoang
(74) *Attorney, Agent, or Firm*—Meyertons Hood Kivlin Kowert & Goetzel, P.C.; B. Noël Kivlin

(57) ABSTRACT

An apparatus and method for resending a request in a computer system using a delay value is provided. In response to receiving a request, a target device in a computer system may detect that it is temporarily unable to process the request. The target device can send a response to the sending device to indicate that it is temporarily unavailable. The response can include a delay value that can provide a hint to the sending device as to when to resend the request. The target device may generate the delay value according to the type of condition that is causing it to be temporarily unavailable. The delay value may be generated according to a static heuristic or a dynamic algorithm based on previous temporarily unavailable conditions. The delay value may also be used by an error recovery mechanism where a sending device exceeds a retry limit for a particular request.

27 Claims, 5 Drawing Sheets

U.S. PATENT DOCUMENTS 6,243,833 B1 * 6/2001 Hitchcock et al. ............ 714/33
6,275,471 B1 * 8/2001 Bushmitch et al. ......... 370/248
6,581,176 B1 * 6/2003 Seo ........................... 714/749

OTHER PUBLICATIONS

IEEE Std 802.3, 2000 Edition, "Local and Metropolitan Area Networks," p. 58.

InfiniBand™ Architecture Release 1.0, Oct. 2000, pp. 238-310.

Anderson, "The Performance of Spin Lock Alternatives for Shared-Memory Multiprocessors," IEEE Transactions on Parallel and Distributed Systems, vol. 1, No. 1, Jan. 1990, pp. 6-16.

MBUS Interface Specification, © 1990-1997 SPARC International, Inc.

* cited by examiner

SYSTEM AND METHOD FOR ENHANCING COMMUNICATION BETWEEN DEVICES IN A COMPUTER SYSTEM

BACKGROUND OF THE INVENTION

1. Field of the Invention

This invention relates generally to the field of computer systems and, more particularly, to communication protocols within computer systems.

2. Description of the Related Art

High speed, low latency communications networks that include unreliable transport media often rely on a communications protocol to implement a reliable message transport.

Examples of such communications protocols include TCP, NGIO 1.0, and PCI 2.x. In some of these protocols, a request can be sent from a sending device to a target device and an acknowledgment (ACK) can be sent in response from the target device back to the sending device. The sending device may include a timeout mechanism such that it can resend the request if an ACK is not received from the target device within a timeout duration set by properties of the communications network.

Some protocols may use a negative acknowledgement (NAK) to indicate that the target device or the communications network has detected an error. Errors can include data corruption, an illegal packet type, etc. The NAK can give a positive indication that an error has occurred and may also indicate the type of error that occurred. A sending device may, depending on the communications protocol, resend the request in response to a NAK.

In some communications networks, certain types of errors may temporarily prevent a target device from processing an incoming request. These types of errors can include a temporary loss of system resources (e.g., a dynamic reconfiguration of a node), a temporary lack of processing resources on the target device, or a lack of a valid virtual to physical address translation in cases where the contents of the request are to be written in the virtual address space of the target device's node. While these errors may be temporary, the time required to resolve them can vary widely. For example, a dynamic reconfiguration of system resources in a server may take on the order of hundreds of milliseconds to resolve, a page miss in the virtual memory system may take on the order of tens of milliseconds to resolve, and a temporary resource unavailability in the network interface may take on the order of hundreds of microseconds to resolve. Thus, the time that the temporary unavailable condition persists may vary by four orders of magnitude or more.

When a target device is temporarily unable to process a request, it can send a NAK to the sending device. The sending device can later resend the request, but it may again receive a NAK from the target device if the temporarily unavailable condition has not been cleared. This process could potentially repeat a large number of times and result in a large increase of traffic on the communications network. Alternatively, the sending device may delay the resending of the request too long (i.e. well beyond the time needed for the target device to resolve the temporarily unavailable condition). As a result, unnecessary latencies may result in the sending device as the processing of its request is delayed. A system and method is needed to more efficiently handle conditions where a target device may be temporarily unavailable.

SUMMARY

The problems outlined above are in large part solved by the use of the apparatus and method described herein. Generally speaking, an apparatus and method for resending a request in a computer system using a delay value is provided. In response to receiving a request, a target device in a computer system may detect that it is temporarily unable to process the request. The target device can send a response to the sending device to indicate that it is temporarily unavailable. The response can include a delay value that can provide a hint to the sending device as to when to resend the request. The target device may generate the delay value according to the type of condition that is causing it to be temporarily unavailable. The delay value may be generated according to a static heuristic or a dynamic algorithm based on previous temporarily unavailable conditions. The delay value may also be used by an error recovery mechanism where a sending device exceeds a retry limit for a particular request.

The apparatus and method described herein may advantageously expedite communication between devices in a computer system. By using the delay value received with a response from a target device, a sending device may more effectively time the resending of a request to more closely correspond with the resolution of a temporarily unavailable condition at the target device. As a result, network traffic and latencies associated with the processing of a request may advantageously be reduced. In addition, the apparatus and method may advantageously allow a target device to determine an appropriate time to retry the resending of a request, thereby allowing a target-independent retry policy at a sending device.

BRIEF DESCRIPTION OF THE DRAWINGS

Other objects and advantages of the invention will become apparent upon reading the following detailed description and upon reference to the accompanying drawings in which.

Figure 1:
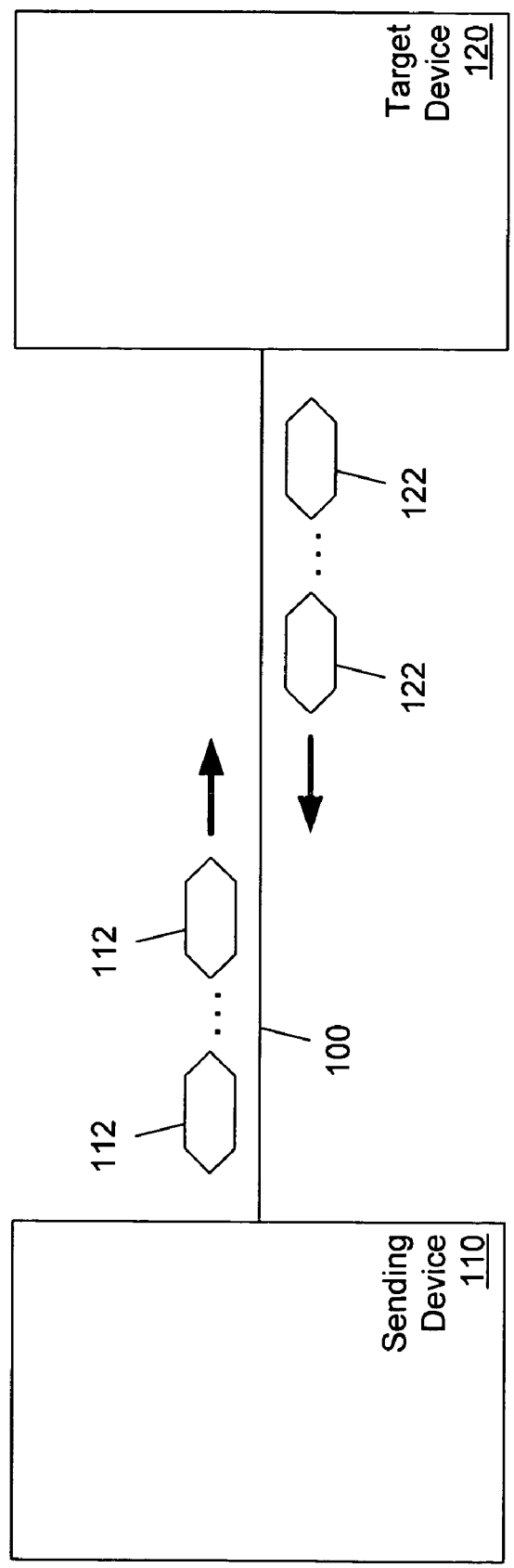
FIG. 1 is a block diagram illustrating one embodiment of devices configured to communicate according to a communications protocol.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF AN EMBODIMENT

Turning now to FIG. 1, a block diagram illustrating one embodiment of devices configured to communicate according to a communications protocol is shown. Other embodiments are possible and contemplated. FIG. 1 depicts sending device 110 coupled to target device 120 using communications medium 100. Communications medium 100 may comprise one or more of the communications networks shown in FIG. 2, FIG. 3, and FIG. 4. Sending device 110 and target device 120 can be configured to exchange packets of information or other suitable forms of information according to a communications protocol.

In the embodiment of FIG. 1, sending device 110 and target device 120 can be configured to exchange requests 112 and responses 122 with one another. For example, sending device 110 can be configured to convey a request 112 to target device 120. Target device 120 can be configured to convey response 122 in response to receiving or processing request 112 from device 110. Response 122 conveyed from target device 120 may comprise an acknowledgment (ACK) or a negative acknowledgment (NAK) according to a communications protocol employed by the devices.

At certain times, target device 120 may be temporarily unable to process a request from sending device 110. These periods may be referred to as "temporarily unavailable conditions" and may occur when target device 120 is handling another operation that temporarily prevents the processing of a request from sending device 110 that encounters the temporarily unavailable condition. Such operations may include a temporarily loss of system resources (e.g., a dynamic reconfiguration of a node), a temporary lack of processing resources on the target device, or a lack of a valid virtual to physical address translation in cases where the contents of the request are to be written in the virtual address space of the target device's node. In response to detecting a temporarily unavailable condition, target device 120 can be configured to convey a negative acknowledgment (NAK) or other type of response to sending device 110. The NAK can indicate to sending device 110 that target device 120 is temporarily unable to process the request received from sending device 110. In certain embodiments, target device 120 can be configured to convey different types of NAKs depending on the type of temporarily unavailable condition detected. The NAK can include a delay value that can be used by sending device 110 as a hint for determining how long to delay the resending of its request. Using the delay value, sending device 110 may advantageously resend its request at a time when target device 120 may be able to process the request, i.e., after sufficient time to allow the temporarily unavailable condition to be cleared at target device 120. In certain configurations or for certain types of temporarily unavailable conditions, sending device 110 may be configured to ignore the delay value and independently determine when to resend its request.

In one embodiment, target device 120 can be configured to generate a delay value according to the type of operation that is causing a temporarily unavailable condition. In this manner, different delay values can be generated for different types of operations as the different types of operations may vary widely as to the amount of time necessary for target device 120 to clear the temporarily unavailable condition. Target device 120 can generate delay values according to a set value for each type of operation, a programmed value for each type of operation, or a dynamically calculated value for each type of operation. Target device 120 may be configured to store historical data from previous temporarily unavailable conditions and may calculate delay values from this data. Target device 120 may also keep track of the number of outstanding responses it has sent for a particular temporarily unavailable condition. In doing so, target device 120 can convey delay values that indicate longer and longer delay periods as the number of outstanding responses increases. The delay value may be encoded to minimize the size and/or number of packets needed for the NAK. In one particular embodiment, the delay value can be encoded according to an exponential encoding in order to cover numerous orders of magnitude range.

In response to receiving a NAK that includes a delay value from target device 120, sending device 110 can use the delay value to determine when to resend its request. If the delay value is sent in an encoded format, sending device 110 can decode the delay value in order to determine when to resend the request. By using the delay value, sending device 110 may resend the request at a time where target device 120 will more likely be able to process the request without unnecessarily delaying the resending of the request. In this manner, overall traffic between sending device 110 and target device 120 may be reduced as sending device 110 may reduce the number of times it resends the request (also resulting in a decrease in the number of NAKs sent by target device 120).

In certain embodiments, a policy layer can determine a retry limit for a particular request sent by sending device 110. In response to sending device 110 resending its request in excess of the retry limit, the policy layer can be configured to detect an error and can initiate an error recovery mechanism based on the type of NAK most recently received from target device 120. In this manner, the type of NAK can allow for different error recovery mechanisms based on different types of temporarily unavailable conditions at target device 120. In other embodiments, the policy layer can be configured to detect an error and can initiate an error recovery mechanism based on the delay value corresponding to the most recently received NAK from target device 120.

Figure 2:
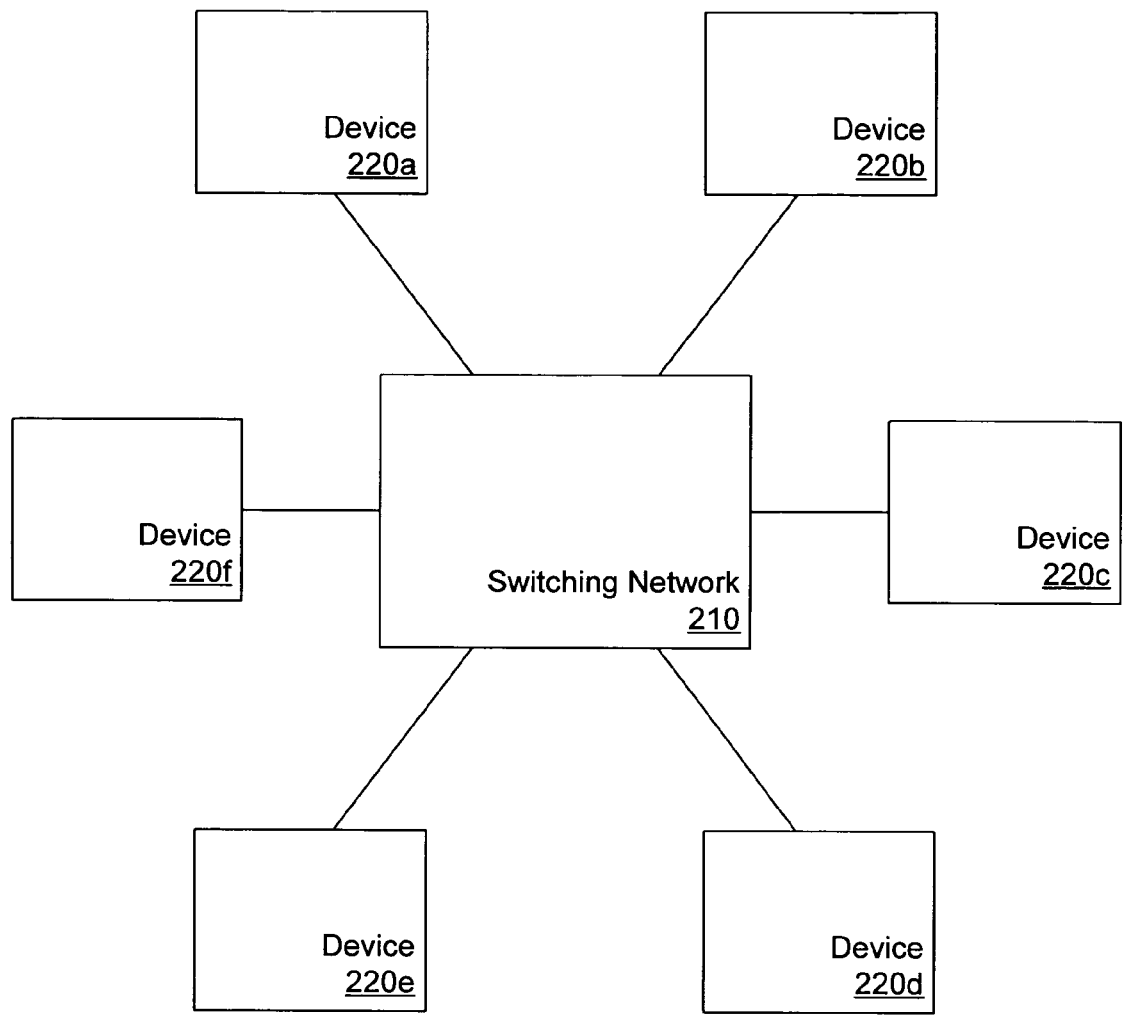
FIG. 2 is a block diagram illustrating one embodiment of a computer system.

Turning now to FIG. 2, a block diagram illustrating one embodiment of a computer system is shown. Other embodiments are possible and contemplated. FIG. 2 depicts devices 220a, 220b, 220c, 220d, 220e, and 220f coupled to switching network 210. Other embodiments may include any number of devices coupled to switching network 210.

Devices 220a, 220b, 220c, 220d, 220e, and 220f can be configured to communicate with one another through switching network 210 using a communications protocol. Switching network 210 can be configured to receive a request from one of devices 220a, 220b, 220c, 220d, 220e, or 220f and route it to the appropriate device 220a, 220b, 220c, 220d, 220e, or 220f. Similarly, switching network 210 can be configured to receive a response to the request from one of devices 220a, 220b, 220c, 220d, 220e, or 220f and route it to the appropriate device 220a, 220b, 220c, 220d, 220e, or 220f. Devices 220a, 220b, 220c, 220d, 220e, and 220f can be configured to use delay values as described above in FIG. 1.

Figure 3:
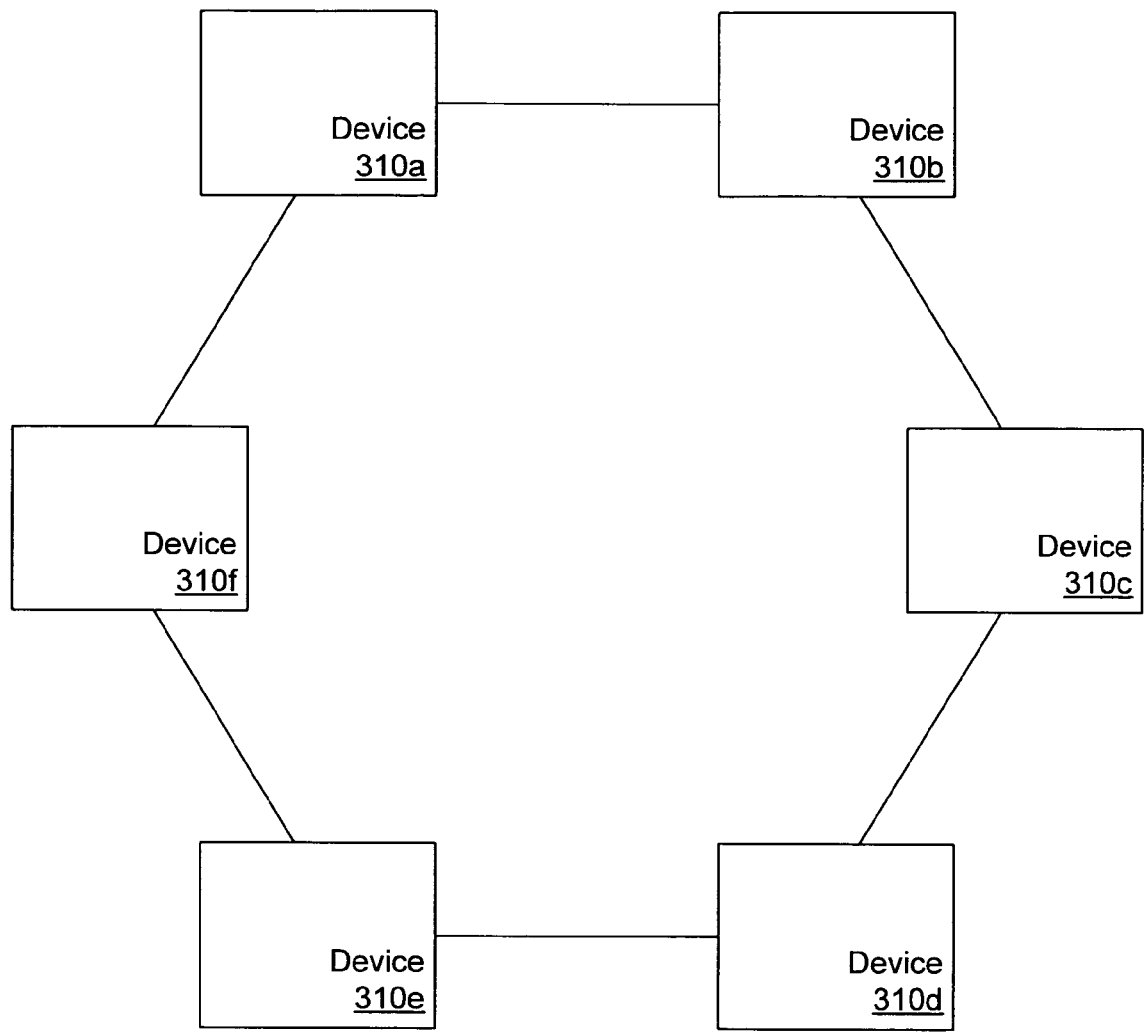
FIG. 3 is a block diagram illustrating one embodiment of a computer system.

Turning now to FIG. 3, a block diagram illustrating one embodiment of a computer system is shown. Other embodiments are possible and contemplated. FIG. 3 depicts device 310a coupled to device 310b, device 310b coupled to device 310c, device 310c coupled to device 310d, device 310d coupled to device 310e, device 310e coupled to device 310f, and device 310f coupled to device 310a in an arbitrated loop. Other embodiments may include any number of devices coupled in an arbitrated loop configuration.

Devices 310a, 310b, 310c, 310d, 310e, and 310f can be configured to communicate with one another through the arbitrated loop using a communications protocol. The devices can send and receive requests and responses from the arbitrated loop and can be configured to use delay values as described above in FIG. 1.

Figure 4:
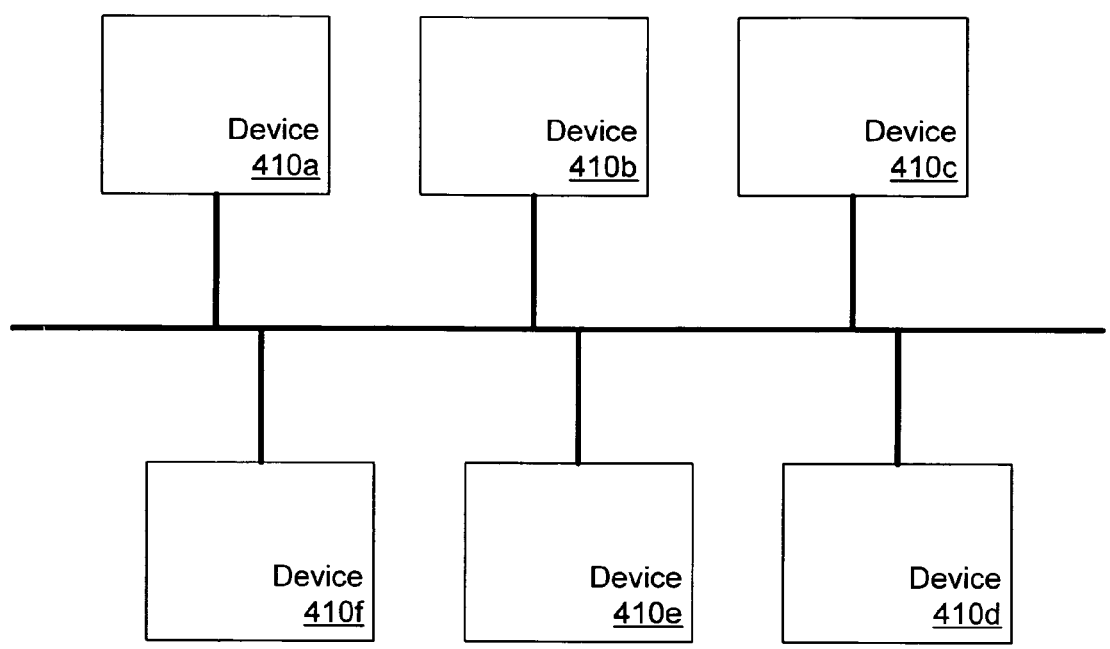
FIG. 4 is a block diagram illustrating one embodiment of a computer system.

Turning now to FIG. 4, a block diagram illustrating one embodiment of a computer system is shown. Other embodiments are possible and contemplated. FIG. 4 depicts devices 410a, 410b, 410c, 410d, 410e, and 410f coupled to shared bus 420. Other embodiments may include any number of devices coupled to shared bus 420.

Devices 410a, 410b, 410c, 410d, 410e, and 410f can be configured to communicate with one another across shared bus 420 using a communications protocol. The devices can send and receive requests and responses from shared bus 420 and can be configured to use delay values as described above in FIG. 1.

Although FIG. 2, FIG. 3, and FIG. 4 illustrate embodiments of configurations for communication between the devices, other configurations and communications media are possible and contemplated.

Figure 5:
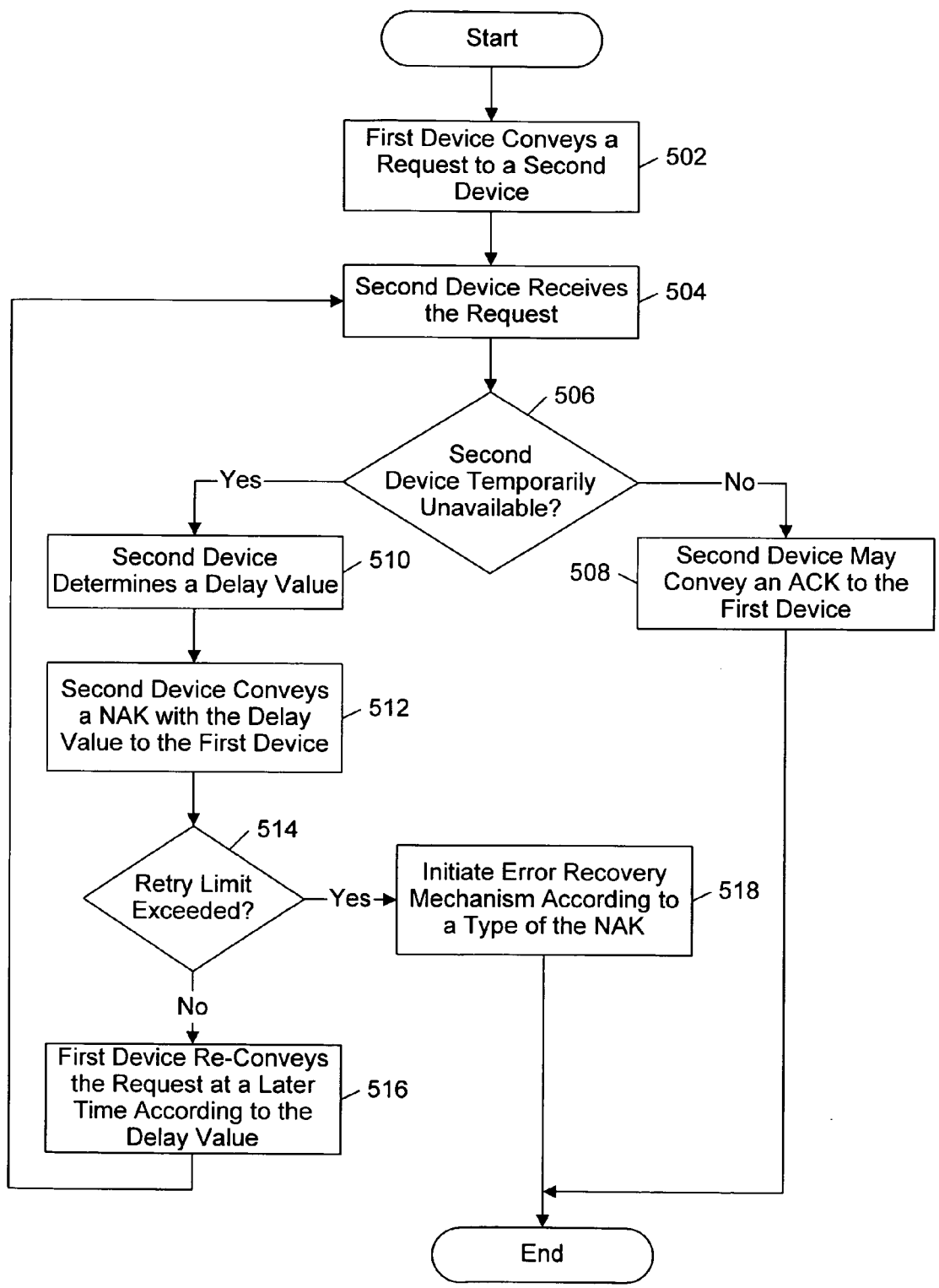
FIG. 5 is a flow chart illustrating a method for enhancing communication in between devices.

Turning now to FIG. 5, a flow chart illustrating a method for enhancing communication in between devices is shown. Variations of the method are possible and contemplated. In FIG. 5, a first device can convey a request to a second device as illustrated in block 502. A second device can receive the request as illustrated in block 504. Block 506 illustrates determining whether the second device is temporarily unavailable. If the second device is not temporarily unavailable, then the second device may convey an acknowledgement (ACK) to the first device as illustrated in block 508. If the second device is temporarily unavailable, then the second device can determine a delay value as illustrated in block 510. The second device can convey a NAK that includes the delay value to the first device as illustrated in block 512. Block 514 illustrates determining whether a retry limit has been exceeded. If the retry limit has not been exceeded, then the first device can re-convey the request at a later time according to the delay value as illustrated in block 516. The method can then resume at block 504 as indicated. If the retry limit has been exceeded, then an error recovery mechanism can be initiated according to a type of the NAK as illustrated in block 518.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications.

We claim:

1. A computer system comprising:
a first device;
a second device coupled to said first device;
wherein said first device is configured to convey a first request to said second device, wherein said second device is configured to receive said first request, wherein said second device is configured to detect a temporarily unavailable condition, wherein said second device is configured to convey a response to said first device corresponding to said first request, and wherein said response includes a delay value corresponding to said temporarily unavailable condition;
wherein said delay value corresponds to a first value in response to said temporarily unavailable condition corresponding to a first type of condition and wherein said delay value corresponds to a second value in response to said temporarily unavailable condition corresponding to a second type of condition; and
wherein, in response to said first device re-conveying said first request to said second device in excess of a retry limit, said first device and said second device are configured to cause an error recovery mechanism to be initiated.

2. The computer system of claim 1, wherein said first device is configured to receive said response, and wherein said first device is configured to re-convey said first request to said second device at a time corresponding to said delay value.

3. The computer system of claim 1, wherein in response to receiving the first request said second device is configured to generate said delay value according to a type of said temporarily unavailable condition detected at the second device.

4. The computer system of claim 3, wherein said type of said temporarily unavailable condition is a temporarily loss of system resources, a temporary lack of processing resources on the second device, or a lack of a valid virtual to physical address translation.

5. The computer system of claim 1, wherein said second device is configured to calculate said delay value using one or more variables that correspond to one or more previous temporarily unavailable conditions.

6. The computer system of claim 1, wherein said delay value corresponds to an encoded value.

7. The computer system of claim 1, wherein one of different types of error recovery mechanism is to be initiated based on a type of temporarily unavailable condition at the second device.

8. The computer system of claim 1, wherein one of different types of error recovery mechanism is to be initiated based on the delay value corresponding to the response conveyed from the second device to the first device.

9. The computer system of claim 1, wherein said second device is configured to generate said delay value based on a number of outstanding responses corresponding to the temporarily unavailable condition.

10. The computer system of claim 1, wherein said second device is configured to generate said delay value according to a set value for each type of temporarily unavailable condition, a programmed value for each type of temporarily unavailable condition, or a dynamically calculated value for each type of temporarily unavailable condition.

11. The computer system of claim 1, wherein said second device is configured to store historical data corresponding to previous temporarily unavailable conditions, wherein said second device is configured to determine said delay value based on the stored historical data.

12. The computer system of claim 11, wherein said delay value may be generated according to a static heuristic based on the previous temporarily unavailable conditions.

13. The computer system of claim 11, wherein said delay value may be generated according to a dynamic algorithm based on the previous temporarily unavailable conditions.

14. The computer system of claim 1, wherein said first device is configured to receive said response including the delay value, wherein said first device is configured to re-convey said first request to said second device at a time corresponding to the delay value, and wherein if the second device detects a temporarily unavailable condition when the first request is again received at the second device, the second device is configured to determine a second delay value based on the temporarily unavailable condition detected at the second device.

15. The computer system of claim 1, wherein said first device is configured to ignore said delay value received from the second device and independently determine when to re-convey said first request.

16. A computer system comprising:
a communications medium;
a first device coupled to said communications medium; and
a second device coupled to said communications medium;
wherein said first device is configured to convey a first request to said second device, wherein after receiving said first request said second device is configured to detect a temporarily unavailable condition, wherein said second device is configured to convey a response to said first device including a delay value corresponding to said temporarily unavailable condition at the second device;
wherein said second device is configured to store historical data corresponding to previous temporarily unavailable conditions, wherein said second device is configured to determine said delay value based on the stored historical data; and
wherein, in response to said first device re-conveying said first request in excess of a retry limit, said first device and said second device are configured to cause an error recovery mechanism to be initiated, and wherein said error recovery mechanism is configured to perform an action according to said response.

17. The computer system of claim 16, wherein said communications medium comprises a switching network.

18. The computer system of claim 16, wherein said communications medium comprises a shared bus.

19. The computer system of claim 16, wherein said communications medium comprises an arbitrated loop.

20. The computer system of claim 16, wherein said second device is configured to calculate said delay value using one or more variables that correspond to one or more previous temporarily unavailable conditions.

21. The computer system of claim 16, wherein said delay value corresponds to an encoded value.

22. A method comprising:
conveying a first request from a first device to a second device;
detecting a temporarily unavailable condition at said second device;
generating a delay value corresponding to said temporarily unavailable condition;
storing historical data corresponding to previous temporarily unavailable conditions at said second device and determining said delay value based on the stored historical data;
conveying a response corresponding to said first request from said second device to said first device, wherein said response includes said delay value; and
in response to said first device re-conveying said first request to the second device in excess of a retry limit, initiating an error recovery mechanism.

23. The method of claim 22, further comprising:
re-conveying said first request from said first device to said second device at a time corresponding to said delay value.

24. The method of claim 22, further comprising:
determining the retry limit associated with the first request.

25. The method of claim 22, wherein said generating further comprises:
determining a type of said temporarily unavailable condition; and
generating said delay value according to said type of said temporarily unavailable condition.

26. The method of claim 22, further comprising:
generating said delay value using one or more variables that correspond to one or more previous temporarily unavailable conditions.

27. A computer system comprising:
a first device; and
a second device coupled to said first device;
wherein said first device is configured to convey a first request to said second device, wherein after receiving said first request said second device is configured to detect any of a plurality of temporarily unavailable conditions, wherein a delay value is associated with each of the plurality of temporarily unavailable conditions and each delay value is a programmable value;
wherein said second device is configured to convey a response to said first device including the delay value associated with a detected one of the plurality of temporarily unavailable conditions at the second device; and
wherein the delay value corresponds to a first value in response to the detected temporarily unavailable condition corresponding to a first type of condition and wherein the delay value corresponds to a second value in response to the detected temporarily unavailable condition corresponding to a second type of condition.

* * * * *